(12) United States Patent
DiValentino

(10) Patent No.: US 7,594,017 B1
(45) Date of Patent: Sep. 22, 2009

(54) METHOD AND SYSTEM FOR ADAPTIVE DATA SYNCHRONIZATION AND TRANSPORT ACROSS MULTIPLE DATA TRANSPORT INFRASTRUCTURES

(75) Inventor: Rocco DiValentino, Farmington, CT (US)

(73) Assignee: PalmSource Inc., Sunnyvale, CA (US)

( * ) Notice: Subject to any disclaimer, the term of this patent is extended or adjusted under 35 U.S.C. 154(b) by 0 days.

(21) Appl. No.: 09/580,272

(22) Filed: May 25, 2000

(51) Int. Cl.
    *G06F 15/16* (2006.01)
(52) U.S. Cl. .................... 709/227; 709/228; 709/229
(58) Field of Classification Search ............. 709/227, 709/226, 228, 229
    See application file for complete search history.

(56) References Cited

U.S. PATENT DOCUMENTS

| | | | |
|---|---|---|---|
| 6,122,670 A * | 9/2000 | Bennett et al. ............. | 709/236 |
| 6,244,758 B1 * | 6/2001 | Solymar et al. ............ | 395/200.54 |
| 6,247,048 B1 * | 6/2001 | Greer et al. ............... | 709/219 |

* cited by examiner

*Primary Examiner*—Larry D Donaghue
*Assistant Examiner*—Adnan Mirza
(74) *Attorney, Agent, or Firm*—Berry & Associates P.C.

(57) ABSTRACT

A method and system for adapting communication protocol between a host computer system and a peripheral computer system depending on the transport infrastructure used, so that communication can be optimized and/or customized to the transport mechanism used. A connection between the two computer systems is made. This connection is via one transport mechanism out of many possible transport mechanisms, such as a serial cradle, networked cradle, modem, cellular wireless, radio frequency, infrared, Internet, etc. The host computer system recognizes which transport mechanism is being used and determines the communication protocol based on the transport mechanism. For example, if the transport mechanism is low bandwidth wireless, the communication protocol may call for data encryption for security and data compression for economy. The communication protocol can be optimized for other parameters, such as authentication of the user attempting data transfer, and restriction on the data set to be transferred. The host system and peripheral computer then communicate using the determined protocol. In one embodiment, the parameters of the communication protocols may be updated by the user of the peripheral computer to affect only that user. In another embodiment, the parameters of communication protocols may be updated by a system administrator and affect all users of that system.

15 Claims, 14 Drawing Sheets

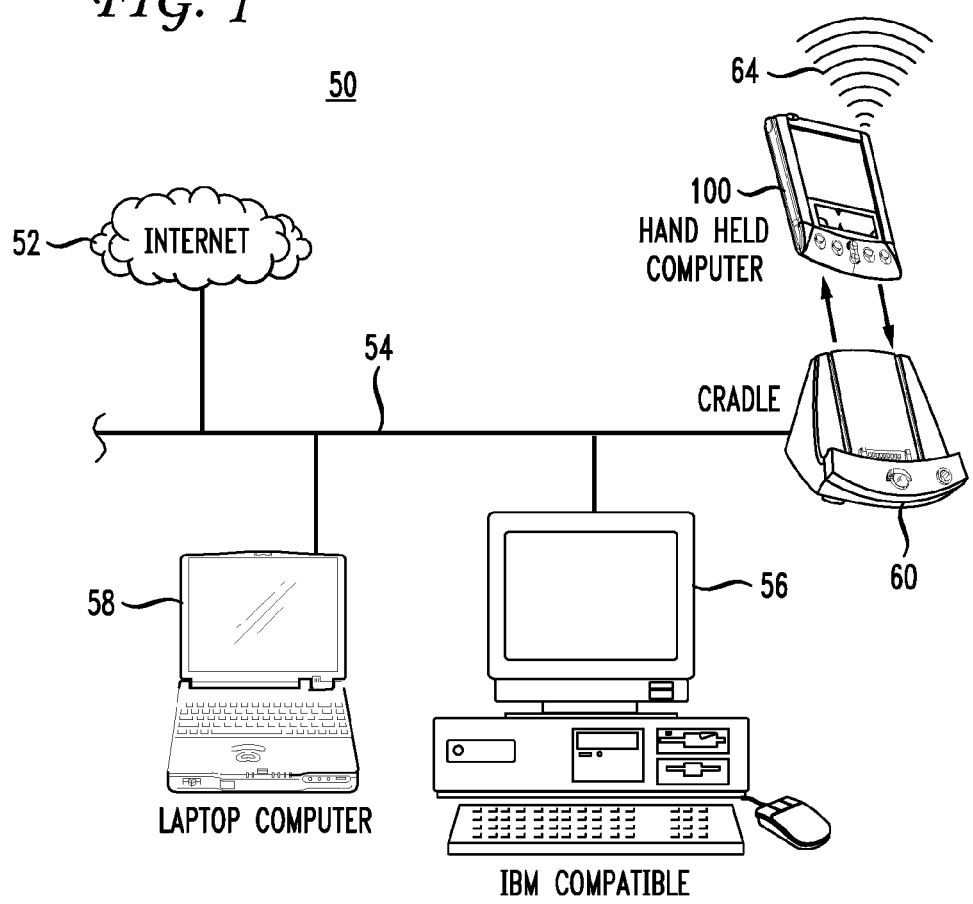

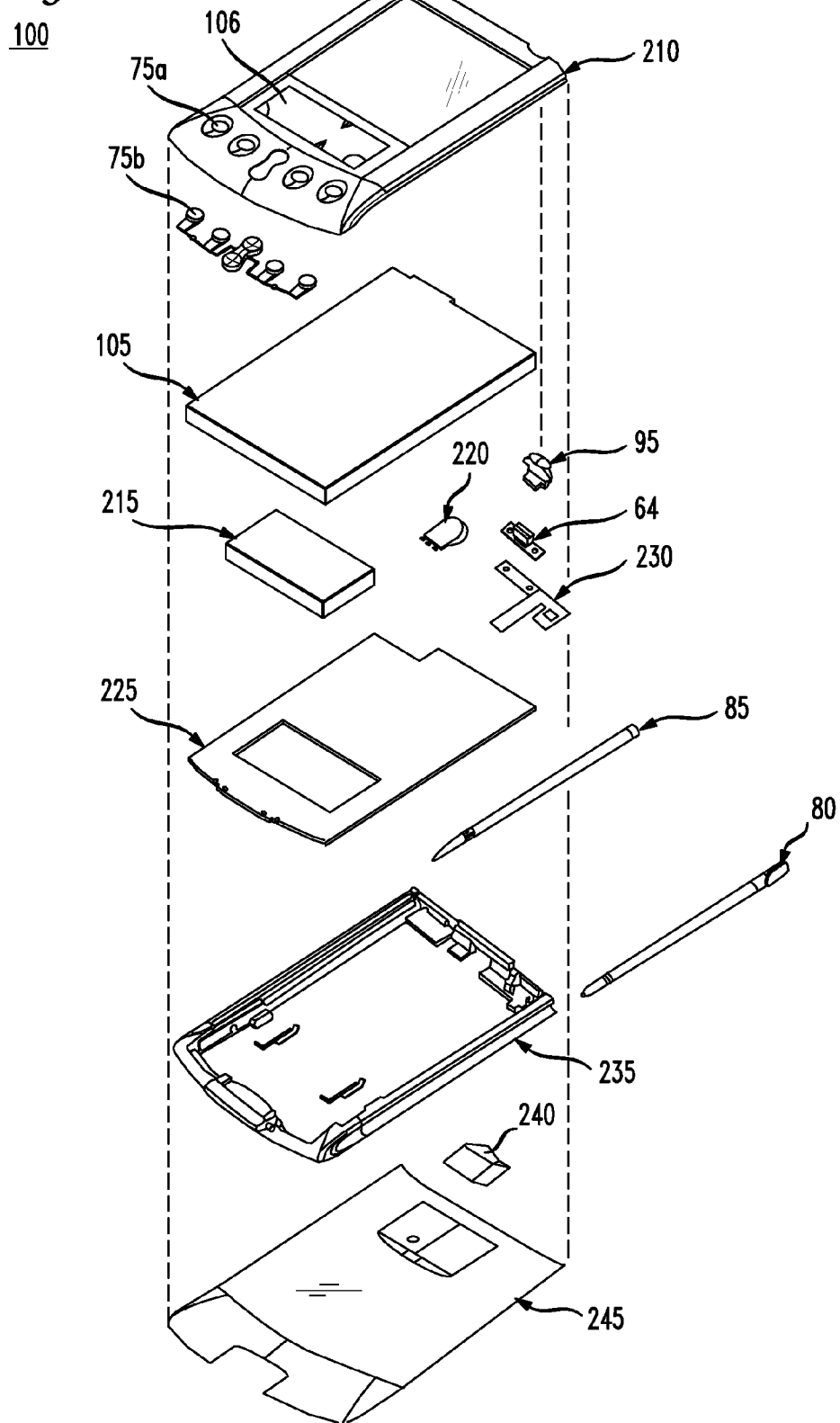

1560

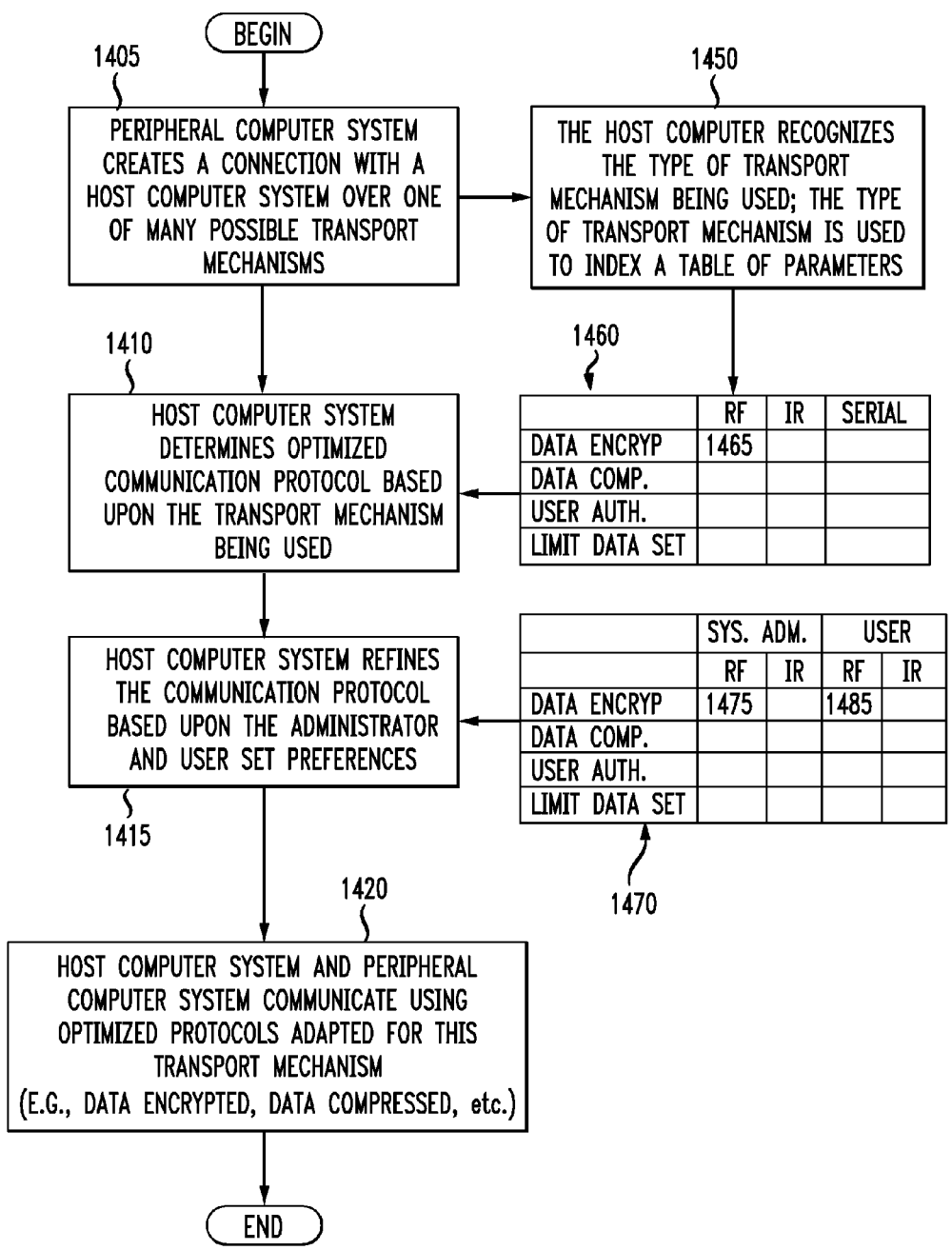

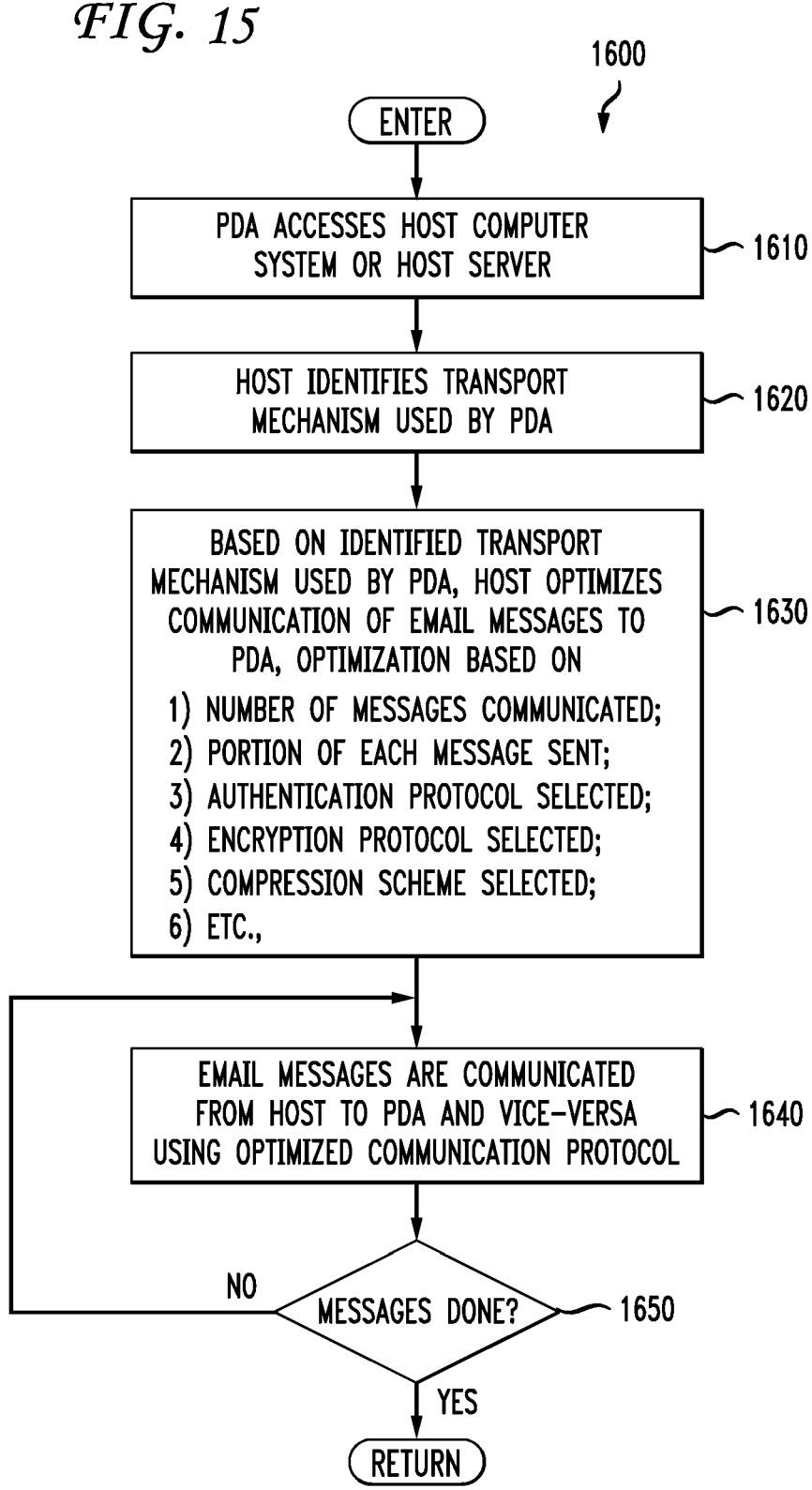

METHOD AND SYSTEM FOR ADAPTIVE DATA SYNCHRONIZATION AND TRANSPORT ACROSS MULTIPLE DATA TRANSPORT INFRASTRUCTURES

BACKGROUND OF THE INVENTION

1. Field of the Invention

The present invention relates to the field of data processing systems. Specifically, the present invention relates to a method and system for adapting data synchronization and transport between a host computer system and a peripheral computer system, the adaptation depending on the transport infrastructure used.

2. Related Art

As the components required to build a computer system have reduced in size, new categories of computer systems have emerged. One of the new categories of computer systems is the "palmtop" computer system. A palmtop computer system (otherwise known as a personal digital assistant or PDA) is a computer that is small enough to be held in the hand of a user and can be "palm-sized." Most PDA computer systems are used to implement various Personal Information Management (PIM) applications such as an address book, a daily organizer and electronic notepads, to name a few.

It has proven convenient to transfer data between a PDA and other computer systems. For example, a PDA may send or retrieve e-mail; synchronize an address book, a daily organizer, or an electronic notepad; or download software from a host system. Furthermore, the PDA may exchange data with the host system. For example, the PDA may be used to enter sales data into a corporate server. In some cases, the other computer system is a desktop computer located a few feet from the PDA, in other cases, the other computer system may be a server located across the continent. PDAs may also exchange data with devices such as cellular phones, as well as other PDAs.

To perform these data exchanges, PDAs may connect to other computers and devices in a variety of ways. For example, when synchronizing with a desktop computer, the user inserts the PDA into a serial cradle device, which connects to the desktop via a serial cable. When connecting to a remote server, the PDA may first contact a network via a modem. The network itself may then connect to the remote server in a variety of ways. If the PDA's user does not have access to a modem, the PDA may be used to connect to a cellular phone via radio frequency. The cellular phone then connects further down the chain to get at the desired data. Alternatively, the PDA may be inserted into a network cradle to make the connection. Thus, the user of a PDA may use a variety of transport mechanisms (e.g., RF, IR, wireless, serial cable, network cradle) to make the connection to the desired data source.

Significantly, these transport mechanisms have different bandwidths, reliabilities, security characteristics, proximities, and cost characteristics. For example, wired transport mechanisms vary in speed from Fast Ethernet to analog modems. Wireless transport mechanisms vary in bandwidth also, from relatively fast 802.11 wireless LAN to slower Mobitex. Furthermore, the different transport mechanisms present different security concerns. Therefore, ideally, when using different transport mechanisms, different parameters (e.g., data compression, data encryption, etc.) are used.

However, when PDAs couple with host systems, the same communication parameters are used for all transport mechanisms. Thus, whether a user is on a high bandwidth LAN or a lower bandwidth cellular link, the same amount of data is transferred regardless of the communication link used. This results in high connection costs for the user, as well as time consuming transfers. Similar problems are faced with other parameters: for instance, a user may need data encryption over a relatively unsecure link, such as wireless, but does not want that overhead when using a secure connection. Unfortunately, conventional systems either force the user to use data encryption at all times or not at all, depending on the particular system in place.

A further problem with this conventional method arises because PDAs generally have relatively low processing power. Therefore, a PDA may take a relatively long time to perform data compression/decompression processes or data encryption processes. Consequently, it is undesirable to force a PDA to send or receive data in these ways for all communication protocols. Unfortunately, the above conventional transfer methods may force a PDA to do just this.

Other conventional systems require a different server to handle each of the different transport mechanisms. Clearly, multiple servers add to the expense and complexity of the design, as a data stream must be routed according to the transport mechanism. Furthermore, as multiple transport mechanisms may be used for a single logical connection, this conventional method faces challenges in routing the data stream to the correct server based on the type of transport mechanism. Additionally, a server may not exist to handle the particular combination of transport mechanisms used.

SUMMARY OF THE INVENTION

Therefore, it would be advantageous, then, to provide a method and system that provides a host system which adapts to the transport mechanism being used between a host computer system and a peripheral computer system and adjusts the communication parameters accordingly to optimize communication. What is further needed is a method and system that adapts when multiple transport mechanisms are used on a single communication link between the host and peripheral computer system. What is still further needed is a method and system that provides for a single host system that adapts communication protocol to any transport mechanism. What is further needed is a method that allows a PDA to send and receive data using an optimized communication protocol that does not require unnecessary PDA processor operations.

Accordingly, the present invention provides a method and system that adapts communication parameters to the transport mechanism being used when a host computer system and a peripheral computer system are synchronizing or otherwise exchanging data in order to communicate. Furthermore, the present method and system adapts when multiple transport mechanisms are being used on a single communication link. Additionally, the present method and system requires a single host computer system regardless of the transport mechanism which might be used. Furthermore, the present method and system does not require unnecessary PDA processor operations. The present invention provides these advantages and others not specifically mentioned above but described in the sections to follow.

A method and system for adapting communication protocol between a host computer system and a peripheral computer system depending on the transport infrastructure used, so that communication can be optimized and/or customized to the transport mechanism used is disclosed. A connection between the two computer systems is made. This connection is via one transport mechanism out of many possible transport mechanisms, such as a serial cradle, networked cradle, modem, cellular wireless, radio frequency, infrared, Internet, etc. The host computer system recognizes which transport mechanism is being used and determines the communication protocol based on the transport mechanism. For example, if the transport mechanism is low bandwidth wireless, the communication protocol may call for data encryption for security and data compression for economy. The communication protocol can be optimized for other parameters, such as authentication of the user attempting data transfer, and restriction on the data set to be transferred. The host system and peripheral computer then communicate using the determined protocol. In one embodiment, the parameters of the communication protocols may be updated by the user of the peripheral computer to affect only that user. In another embodiment, the parameters of communication protocols may be updated by a system administrator and affect all users of that system. In one embodiment, the parameters are adjusted depending upon the transport mechanism used by a host and peripheral system exchanging e-mail.

In another embodiment of the present invention, any number of transport mechanisms may be used on a single communication link between the host computer system and the peripheral computer system. The present invention adapts to this multiple transport mechanism scenario and determines the best communication protocol for the given configuration.

In still another embodiment of the present invention, a personal digital assistant functions as the host computer system and recognizes which transport mechanism is being used and determines the communication protocol based on the transport mechanism.

In yet another embodiment of the present invention, both the host computer system and the peripheral device, e.g., a personal digital assistant each recognize which transport mechanism is being used and determine the communication protocol based on the transport mechanism.

BRIEF DESCRIPTION OF THE DRAWINGS

FIG. 1 is system illustration of an exemplary PDA computer system connected to other computer systems and the Internet via a cradle device.

FIG. 3 is an exploded view of the components of the exemplary PDA computer system of FIG. 2A.

FIG. 14 is a combination flowchart/data structure showing the steps of adapting communication parameters to the transport mechanism and showing a data structure which can be used for this process, according to an embodiment of the present invention.

FIG. 15 is a flowchart showing the steps of adapting communication parameters to the transport mechanism, according to an e-mail embodiment of the present invention.

DETAILED DESCRIPTION OF THE INVENTION

Figure 2A:
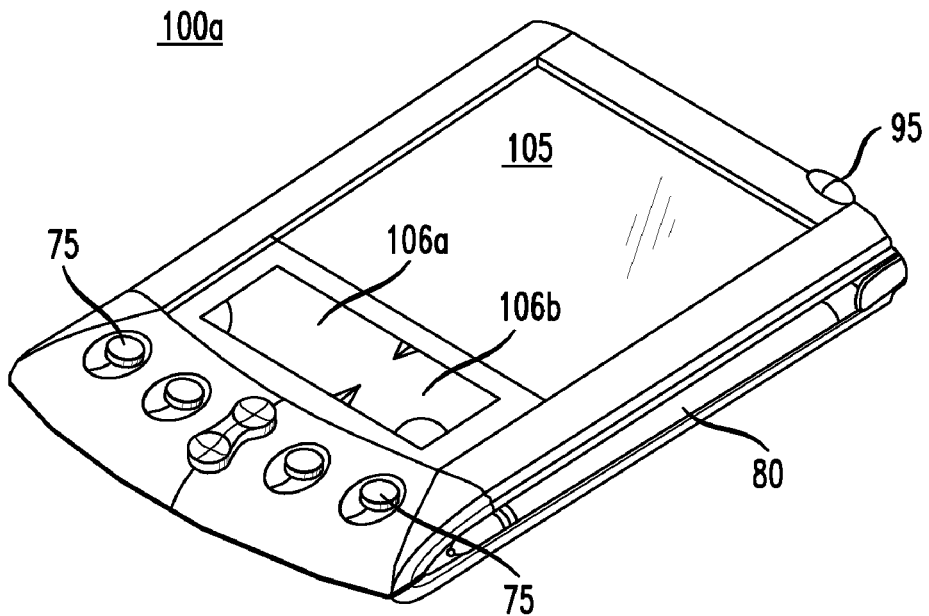
FIG. 2A is a top side perspective view of an exemplary PDA computer system.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Personal Digital Assistant Platform

FIG. 1 illustrates a system 50 that can be used in conjunction with various embodiments of the present invention. It is appreciated that the present invention can operate with a variety of host computer and peripheral computer platforms and that system 50 is merely exemplary. System 50 comprises a host computer system 56 which can be a desktop unit as shown or a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a peripheral computer system, e.g., a personal digital assistant (PDA) 100. The PDA 100 may be a palm top ("palm-sized") portable computer system, an intelligent cellular telephone, or the like. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

FIG. 2A is a perspective illustration of the top face 100a of one embodiment of the exemplary PDA computer system. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
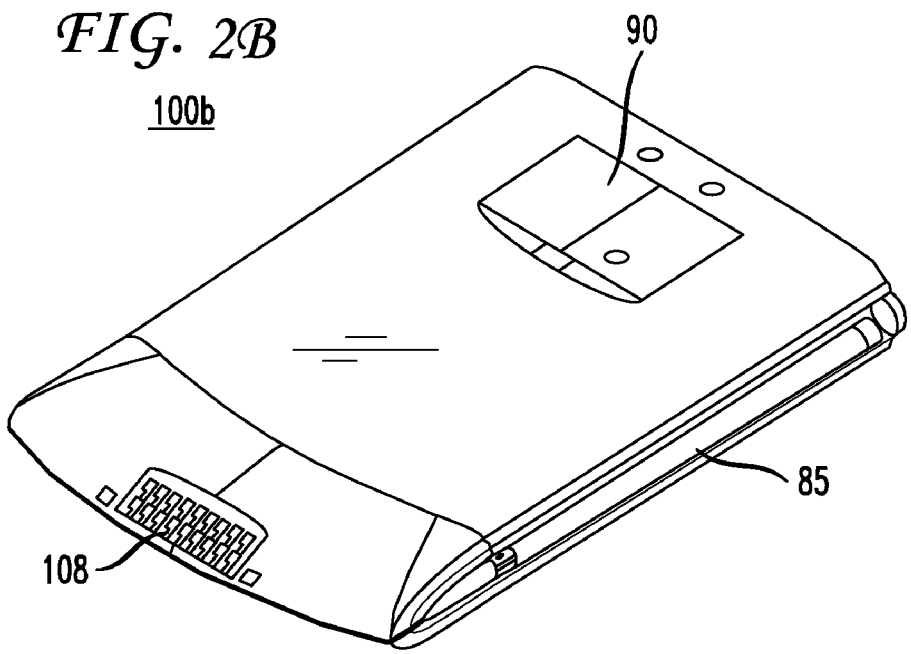
FIG. 2B is a bottom side perspective view of the exemplary PDA computer system of FIG. 2A.

FIG. 2B illustrates the bottom side 100b of one embodiment of the exemplary PDA computer system that can be used in accordance with various embodiments of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

FIG. 3 is an exploded view of the exemplary PDA computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A mid-frame 235 is shown along with stylus 80. Position adjustable antenna 85 is shown.

A radio receiver/transmitter device 240 is also shown between the mid-frame and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
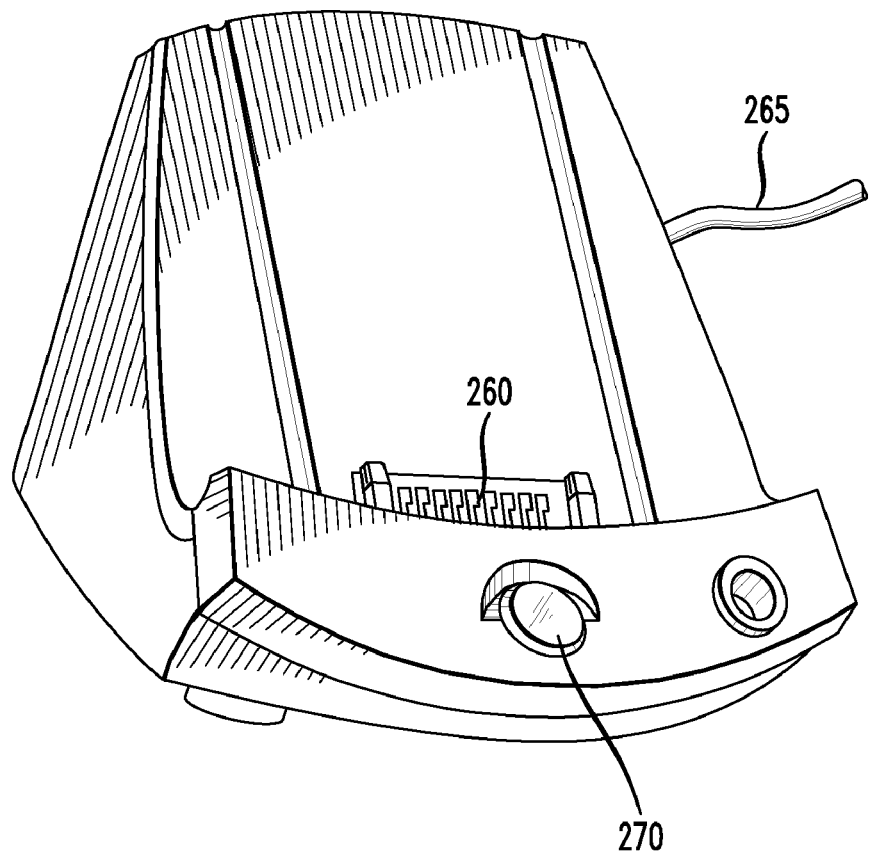
FIG. 4 is a perspective view of the cradle device for connecting the exemplary PDA computer system to other systems via a communication interface.

FIG. 4 is a perspective illustration of one embodiment of the cradle 60 for receiving the exemplary PDA computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
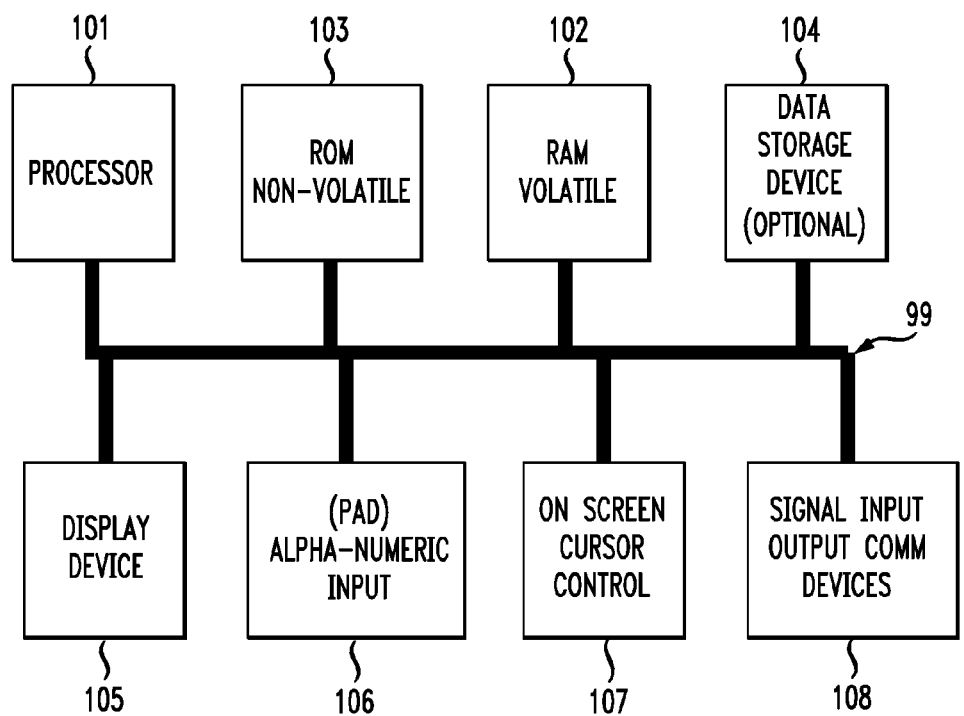
FIG. 5 is a logical block diagram of the exemplary PDA computer system in accordance with an embodiment of the present invention.

FIG. 5 illustrates circuitry of computer system 100, some of which can be implemented on PC board 225. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 6:
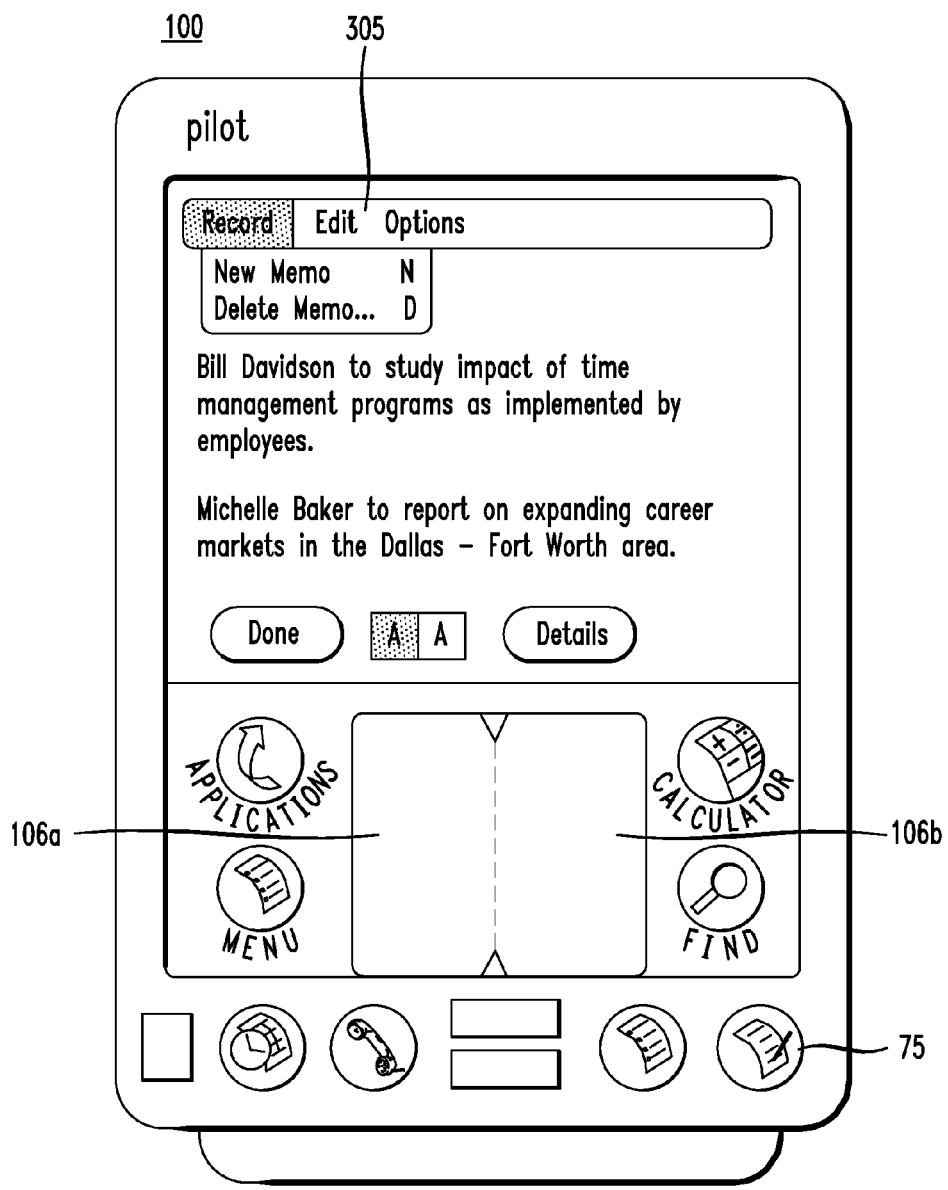
FIG. 6 is a front view of a exemplary PDA computer system illustrating the display screen, digitizer regions and an exemplary menu in accordance with the present invention.

FIG. 6 is a front view of the exemplary PDA computer system 100 with a menu bar 305 open displaying a pull down window. Also shown are two regions of digitizer 106*a* and 106*b*. Region 106*a* is for receiving user stroke data for alphabet characters, and typically not numeric characters, and region 106*b* is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters.

Method and System for Adaptive Data Synchronization and Transport Across Multiple Data Transport Infrastructures The present invention provides for a method and a system that optimize data transfers between a host computer system and a peripheral computer system, such as a PDA, depending on the transport mechanism used. The host computer system may be any source of information, e.g., a desktop, a server, a web-based server, a LAN, etc. FIGS. 7-12 illustrate systems connected with possible transport mechanisms. The present invention determines what transport mechanism or mechanisms are being used and transfers data using communication protocols which are optimized for the given transport mechanism(s). The communication protocols are made up of parameters including, but not limited to: data compression, data encryption, communication rate, maximum character length allowed to be transmitted, user authentication, and data set limitation.

Figure 7:
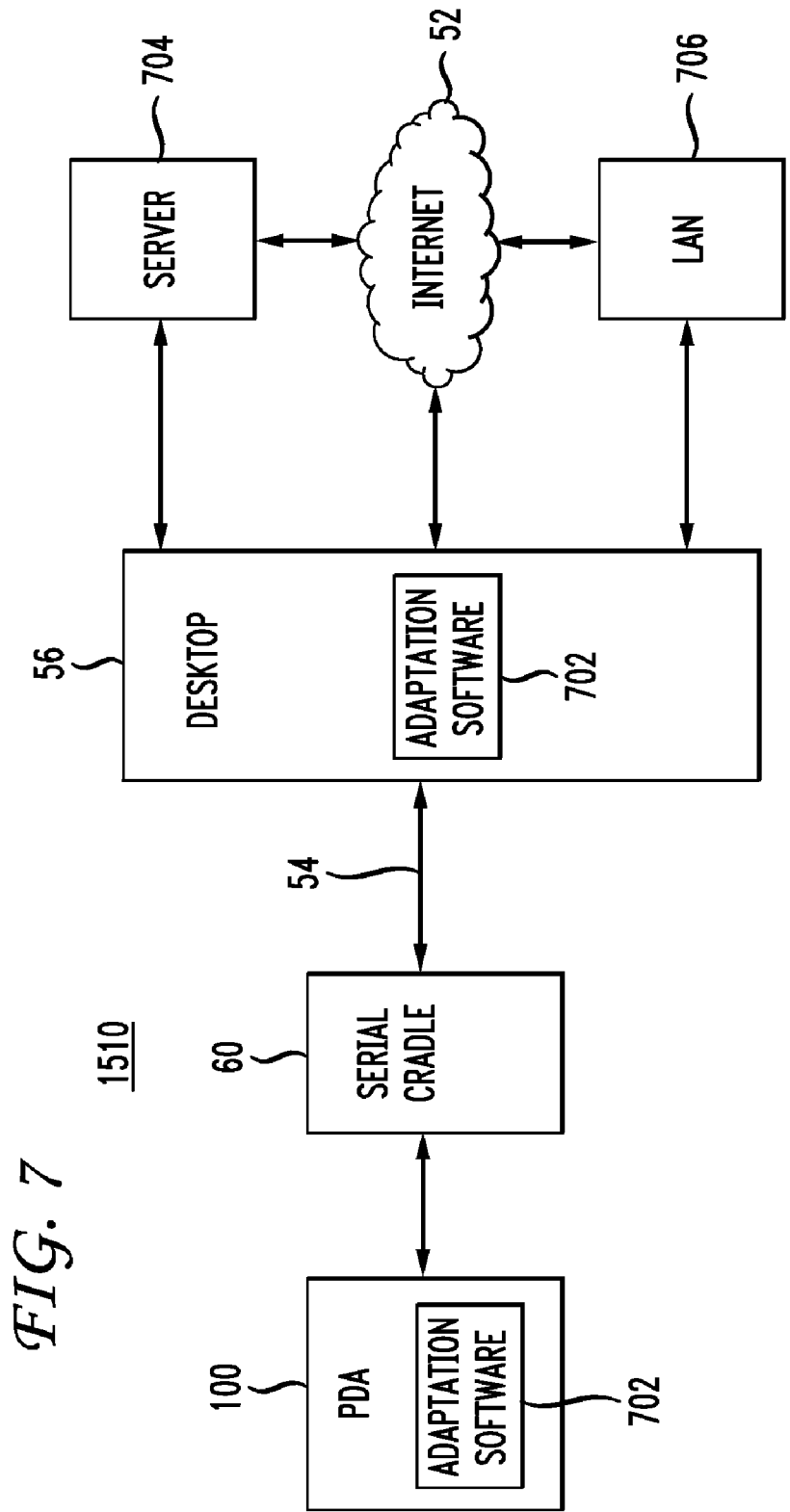
FIG. 7 is a block diagram of a peripheral computer system connecting to a desktop computer via a serial cradle, according to an embodiment of the present invention.

FIG. 7 illustrates an exemplary system 1510 having a PDA 100 coupled to a host system 56. In system 1520, a PDA 100 is connected to a serial cradle 60, which in turn is connected via serial communication bus 54 to a desktop computer system 56 (the host system). (The PDA 100 is inserted into the serial cradle 60, see FIG. 4.) Thus, the communication link is established via the transport mechanism of a serial cradle device. In this embodiment, adaptation software 702, which determines the transport mechanism being used, resides on the desktop computer system 56. Because the serial communication bus 54 is relatively fast and secure, it is not necessary to use data encryption or data compression, and it is possibly not necessary to use password protection. Furthermore, using data compression may slow down the transfer because the PDA is forced to run a compression or decompression algorithm, and PDAs generally have relatively low processor power.

In other embodiments, the adaptation software 702 may reside on the server 704, the LAN 706, or on an Internet 52 based server (not shown). In these embodiments, information regarding the transport mechanism used by the PDA 100 is passed through the desktop 56 and on to the other computer system, which then determines the appropriate communication protocol. It will be understood that the adaptation software 702 may reside in whatever location is suitable to determine the necessary communication protocol between PDA 100 and the host system 56. Furthermore, the adaptation software 702 may be a part of another program such as an e-mail server program or a synchronization program.

In another embodiment of the present invention, adaptation software 702 resides on the PDA 100. In this fashion, the PDA 100 may recognize the transport mechanism being used and determine the appropriate communication protocol. In still another embodiment, both the PDA 100 and the host 56 have adaptation software 702. Thus, they adapt to the transport mechanism together.

Figure 8:
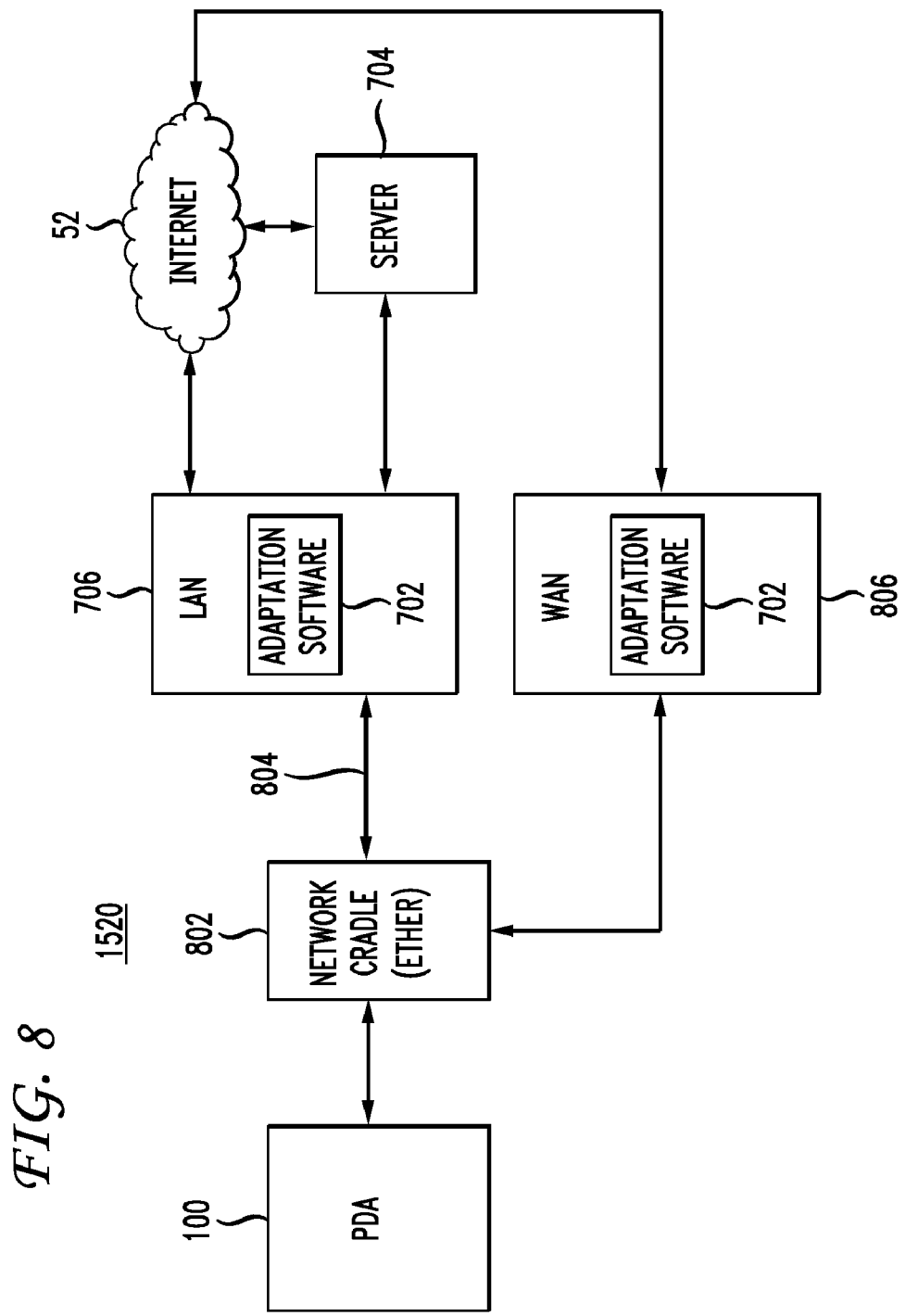
FIG. 8 is a block diagram of a peripheral computer connecting to a Local Area Network via a network cradle, according to an embodiment of the present invention.

FIG. 8 illustrates a system 1520 having a PDA 100 connected to a LAN 706 via a network cradle 802. The transport mechanism 804 may be wired or wireless, such as 802.11 wireless LAN. In this embodiment, the host system 704 is coupled to the LAN 706 and the adaptation software 702 resides on the LAN and is able to determine the transport mechanism being used and determines the communication protocol accordingly. The LAN 706 may connect to another server 704 or the Internet 52. A wide area network (WAN) 806 is also connected to the network cradle 802. While both the LAN and the WAN may provide for wireless transmissions, the WAN may have lower speed and be less reliable than the LAN. Consequently, the adaptation software 702 on the LAN will handle the transfer somewhat differently than the adaptation software 702 on the WAN 806. For example, when using the WAN to retrieve pricing or e-mail information, the PDA 100 may only receive high priority information. The user may connect the PDA 100 to the LAN 706 to receive full pricing information.

Figure 9:
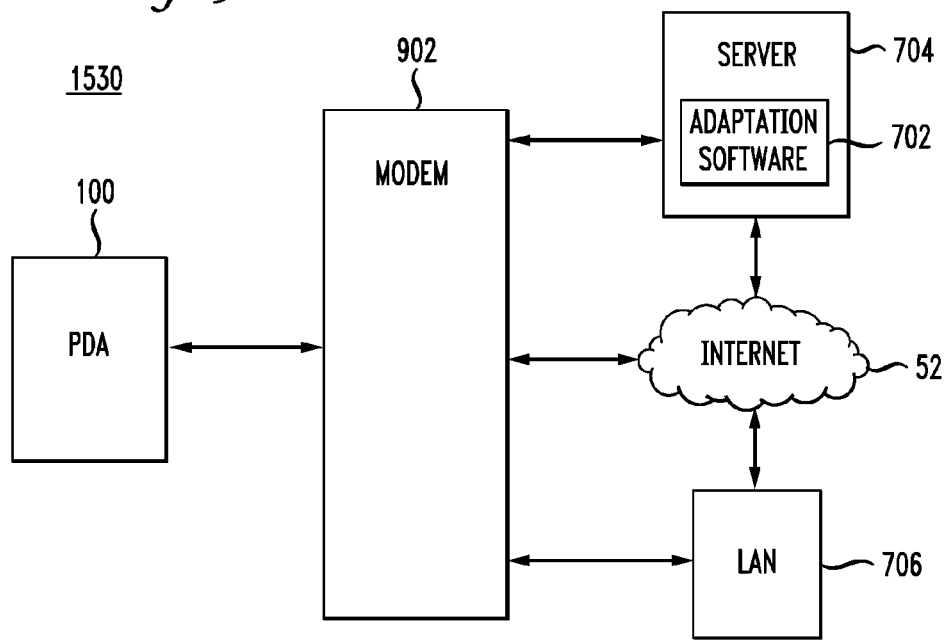
FIG. 9 is a block diagram of a peripheral computer connecting to the Internet via a modem, according to an embodiment of the present invention.

FIG. 9 illustrates a system 1530 in which a PDA 100 is connected to a host server 704 via a modem 902. The host server 704, is used to provide access to the Internet 52. The transport mechanism is based on modem 902. In this embodiment, the adaptation software 702 resides on the server 704. However, the adaptation software may also reside on the LAN 706. In this embodiment, if the modem is relatively slow, the adaptation software 702 may use data compression to reduce data volume and hence speed up data transfers. Furthermore, security issues may require use of encryption when a PDA user contacts a corporate server in this fashion. Additionally, user authentication presents different concerns when connecting to a corporate server than when connecting to a desktop. Consequently, this will be factored into the communication protocol.

Figure 10:
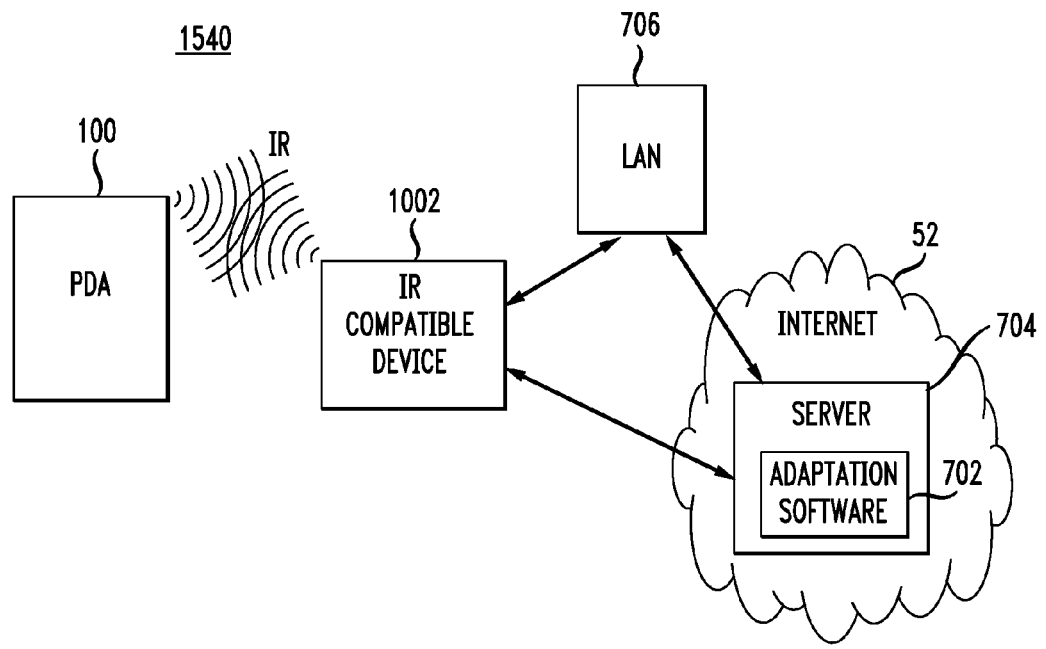
FIG. 10 is a block diagram of a peripheral computer connecting to the Internet while using an wireless Infrared transport mechanism, according to an embodiment of the present invention.

FIG. 10 illustrates a system 1540 in which a PDA 100 is connected to a host server 704, which is illustrated as part of the Internet 52. In this embodiment, the adaptation software 702 resides on the host server 704. The adaptation software 702 may reside on the LAN 706, as well. The transport mechanism includes the Internet in this case. Because, the adaptation software 702 determines that an Infrared transport mechanism is being used, all data transfers are performed with data compression for efficiency in this embodiment. In another embodiment, a limited data set is transferred. For example, when a user is downloading e-mail, attachments may not be sent, or only e-mail flagged as urgent or of a high priority will be sent. The user may download these attachments at a later time, for example when connected to a desktop computer 56 through a serial cradle 60. When downloaded, the attachments will be automatically associated with their respective e-mail messages.

Figure 11:
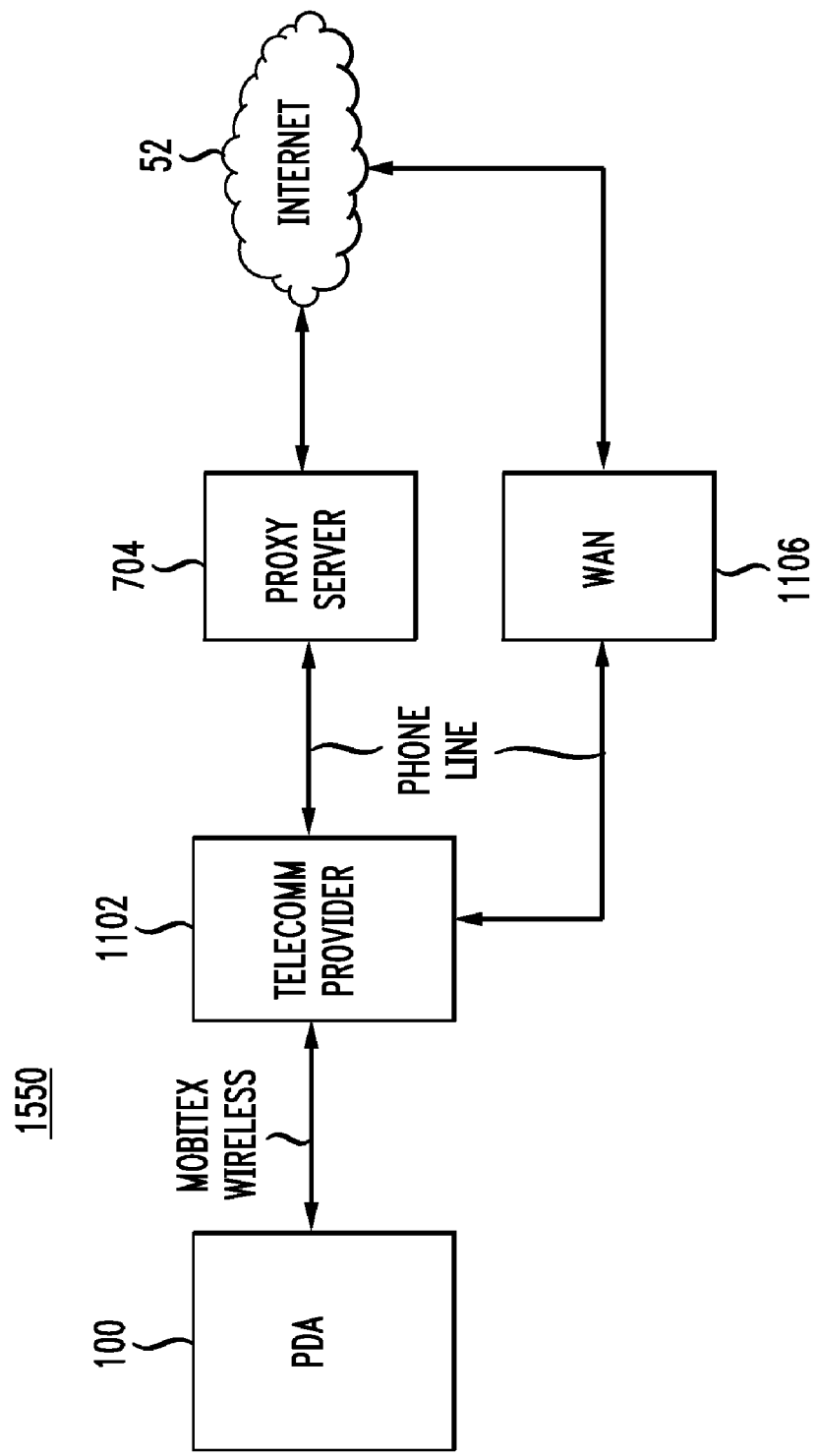
FIG. 11 is a block diagram of a peripheral computer connecting to the Internet through a telecommunications provider reached via a Mobitex wireless transport mechanism, according to an embodiment of the present invention.

FIG. 11 illustrates a system 1550 including a PDA 100 connecting to the Internet 52 by first connecting to a telecommunications provider 1102 via Mobitex wireless communication system, for instance. The telecommunications provider 1102 then provides for the Internet 52 connection through a proxy server 704. The transport mechanism therefore includes a wireless link. When using wireless transport mechanisms, security becomes a larger concern. Therefore, the transmission may be encrypted. Furthermore, cost of the transmission is a key factor with respect to the wireless communication provider, e.g., Mobitex. Consequently, data compression may be used here to speed up the transmission.

Figure 12:
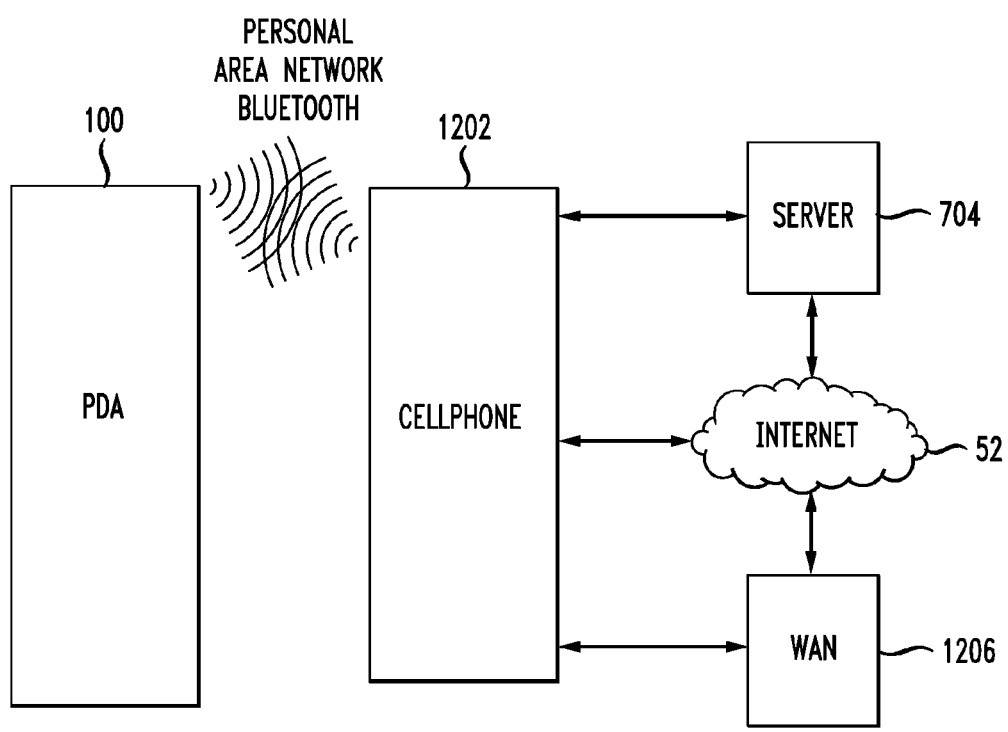
FIG. 12 is a block diagram of a peripheral computer connecting to the Internet via a cellular phone reached via a personal area network radio frequency transport mechanism, according to an embodiment of the present invention.

FIG. 12 illustrates a system 1560 including a PDA 100 connecting to a cellular phone 1202 via a personal area network radio frequency transport mechanism. The cellular phone 1202 then connects to the server 704. A wide area network (WAN) 1206 is also illustrated in FIG. 12. While WANs cover large regions, they are somewhat slower and sometimes less reliable than local area networks. Therefore, these factors will be used to determine the communication protocol if that path is taken. Furthermore, there are several transport mechanisms being used when the PDA 100 connects with the Internet 52 in this example. In one embodiment of the present invention, the adaptation software 702 takes all transport mechanisms into consideration when determining the communication protocol.

Figure 13:
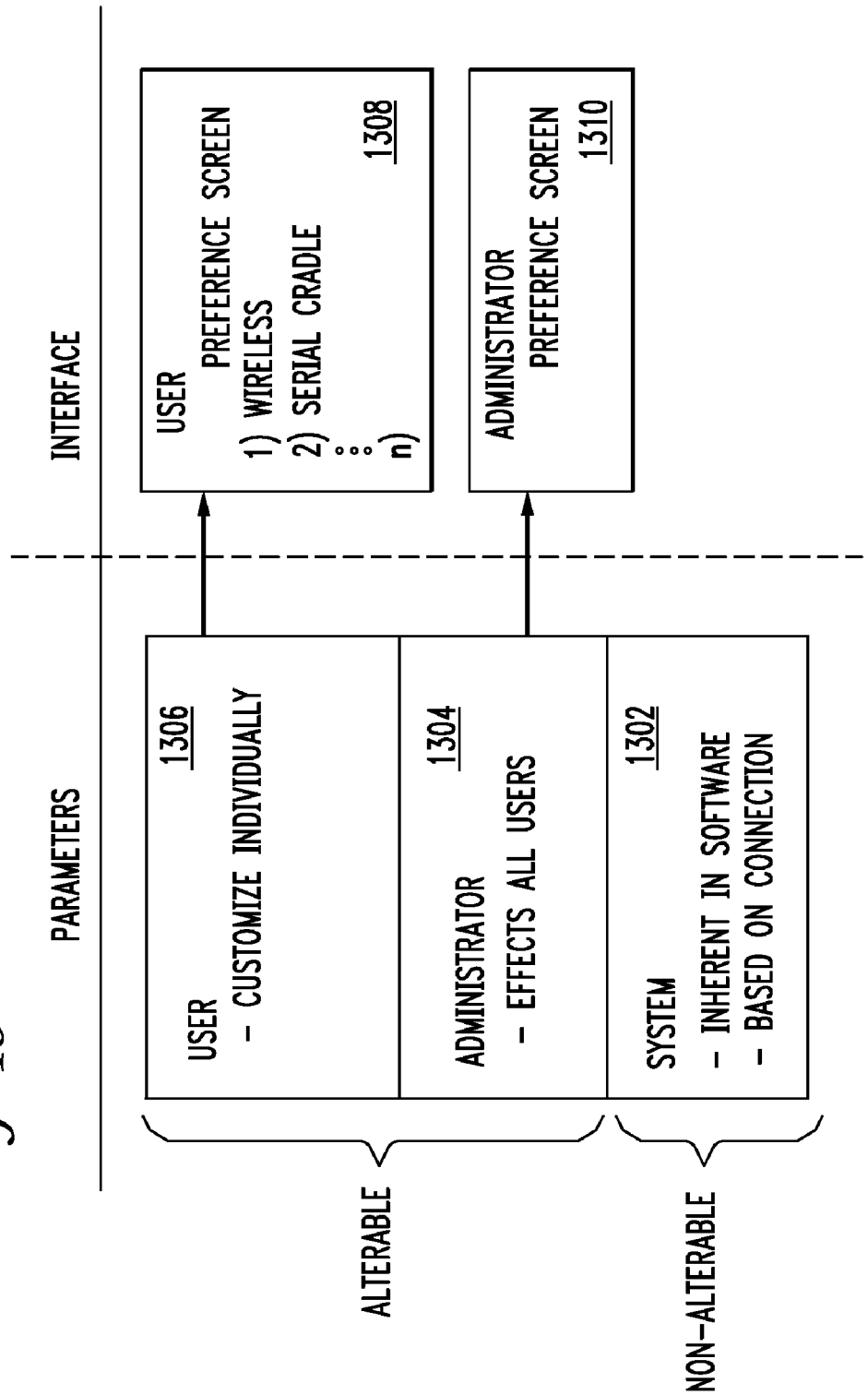
FIG. 13 is a conceptual diagram illustrating levels at which the communication protocols are set or may be altered, according to an embodiment of the present invention.

The communication protocols are established in a variety of ways, according to the present invention, depending on the transport mechanism used to link the PDA 100 and the host computer system. FIG. 13 shows a conceptual illustration of various levels in which the communication protocols may be established or altered. At the bottom are the system level parameters. Communication protocols at this level are non-alterable. That is to say, they are set in the adaptation software 702 and are based upon a scheme which optimizes data transfers on the given transport mechanism. It will be clear to those of ordinary skill in the art that the communication protocols in the adaptation software 702 may be different in different embodiments of the present invention. For example, a mail server program may have different communication protocols than a synchronization program. Additionally, a single program may have different communication protocols depending on the data being transferred. For example, a synchronization program may use a different protocol when downloading software than when synchronizing a calendar program. These types of communication protocols are set by the system level parameters.

Still referring to FIG. 13, above the system layer, conceptually, are the system administrator layer 1304 parameters. In one embodiment of the present invention, the communication protocols may be altered by a system administrator with the changes affecting all users of the system. For example, the system administrator may be concerned with bandwidth use and hence may limit data transfers to a given size. This may be implemented to save a company money or simply to make the user's experience acceptable. In one embodiment, an administrator parameter program resides on the host computer 56 to allow the administrator to update the parameters.

Still referring to FIG. 13, the user level 1306 parameters are at the highest level conceptually. At this level, the user may customize the communication protocols for this user alone. In one embodiment, this is implemented by the user displaying a user preference screen 1310 containing the various transport mechanisms (RF, IR, serial cradle, etc.) and various communication protocols (data compression, data set limitation, etc.) to be used with the given transport mechanism. In this fashion, the user may set more stringent requirements than are required by a lower level, and the user may customize the communication protocols to his/her own preferences based on the possible transport mechanisms that can be used by the user. For example, the user may not wish e-mail attachments to be sent even though it is allowed for the given transport mechanism. However, the user is not allowed to sidestep protocols set at a lower level, for example a limit on the size of data transfers when using a wireless connection will control if made at the system or administrator level. In one embodiment, a user parameter program resides on the PDA 100 to allow the user to update the parameters.

FIG. 14 illustrates the steps of the process of adapting the communication protocol to the transport mechanism being used, according to one embodiment of the present invention. FIG. 14 also shows data structures which may be used in this process. In step 1405, a peripheral computer system creates a connection with a host computer system. This connection occurs over one of many possible alternative transport mechanisms, such as IR, RF, serial cradle, network cradle, etc. Box 1450 illustrates that the type of transport mechanism is identified and is passed on to the host computer system 56 (or server 704, LAN 706, etc.).

Box 1460 illustrates a data structure which is used in one embodiment to determine the communication protocol for each transport mechanism. A given column contains the communication protocol for one transport mechanism (RF, IR, Internet, Modem, etc.) Only a few of the columns are shown in box 1460. Each cell contains a value which defines the communication parameter. For example, the value in cell 1465 defines what data encryption is to be used when the transport mechanism is radio frequency. The values in box 1460 may be established by a host e-mail program, or another program. In this fashion, the e-mail or other program may transfer messages encrypted when RF or any wireless transport mechanism is used and not compressed when a serial cable is used by the PDA 100. With knowledge of the transport mechanism passed to it, the host system 56 determines, in step 1410, the communication protocol to use for optimizing or customizing data transfers between the host system 56 and the peripheral computer system 100.

In step 1415, the host system 56 refines the parameters based upon the administrator and user set preferences. In one embodiment, a table such as the one illustrated in box 1470 may be used for this purpose. For example, cell 1475 contains a value for data encryption to be used when the transport mechanism is RF, per the system administrator's preference. If the e-mail program which set the value in cell 1465 did not call for encryption, the system administrator concerned with security could do so. Cell 1485 contains a value set by the user for the encryption to be used when the transport mechanism is RF. Thus, the present invention is flexible in allowing the parameters to be set at various levels. Those of ordinary skill in the art will understand that various algorithms are possible to decide which value of the three (host system, administrator, user) will be chosen when conflicts exist. Furthermore, it will be clear that limitations may be placed on the preferences set by the system administrator, and especially the user.

In step 1420, data is transferred between the host 56 and the peripheral computer system 100 using the determined protocol from step 1420 and modified by step 1415. This transfer may be accomplished with communication software residing on said host computer system.

FIG. 15 illustrates a flowchart 1600 of an e-mail embodiment of the present invention. In step 1610, a PDA 100 accesses a host computer system or host server to exchange e-mail. The PDA establishes the communication link via one of a number of transport mechanisms. In step 1620, the host system 56 identifies the transport mechanism used by the PDA.

In step 1630, the host optimizes the communication of e-mail messages based upon the transport mechanism used. For example, if the transport mechanism is wireless, time and cost factors may limit the messages in number, size, and urgency. Also, attachments may not be sent, and a highly compressed scheme may be used. Additionally, a system administrator concerned with security could select the encryption protocol, as well as the authentication protocol.

In step 1630, e-mail messages are communicated in both directions between the host system 56 and the PDA 100. In step 1650, the process continues until all messages are transferred. A user of a PDA 100 is free to change the communication parameters at any time. Thus, a sensitive message could be sent encrypted, while the rest are not. If there are messages or portions thereof which were withheld from transfer, the user may retrieve them by accessing the host 56 via a transfer mechanism for which transfer of those messages is allowed.

The preferred embodiment of the present invention, a method and system for adapting to the transport mechanism being used between a host computer system and a peripheral computer system and adjusting the communication parameters accordingly, is thus described. While the present invention has been described in particular embodiments, it should be appreciated that the present invention should not be construed as limited by such embodiments, but rather construed according to the below claims.

What is claimed is:

1. A method of communicating with a peripheral computer system comprising the steps of:
    a) creating a two-way communication link from a personal digital assistant with a host computer system using one transport mechanism of a plurality of possible transport mechanisms;
    b) said host computer system recognizing said one transport mechanism used in step a) by adaptation software executing on said host computer system;
    c) said host computer system determining a communication protocol from a plurality of possible communication protocols based on recognition of said one transport mechanism, wherein said determining comprises indexing a table with said one transport mechanism recognized in step b) to determine at least one parameter in the communication protocol, and wherein said table comprises parameters that are designed to improve communication based on the transport mechanism wherein said communication protocol determined at step c) selects a particular user authentication protocol performed to establish data communication between said personal digital assistant and said host computer system and said communication protocol determined at step c) selects a particular data encryption protocol performed to establish data communication between said personal digital assistant and host computer system; and
    d) said host computer system communicating information to said personal digital assistant based on said communication protocol determined at step c).

2. A method as described in claim 1 wherein said plurality of transport mechanisms comprises: communication via a serial line coupled to said host computer; communication via a networked line coupled to said host computer using a network; communication via a wireless link to said host computer; and communication via the Internet.

3. A method as described in claim 1 wherein said communication protocol determined at step c) restricts data volume communicated to said personal digital assistant peripheral computer system.

4. A method as described in claim 1 wherein said communication protocol determined at step c) selects a particular data set that can be accessed by said personal digital assistant.

5. A method as described in claim 1 and further comprising the step of e) updating said plurality of communication protocols by updating said table on said host computer system, wherein said step e) comprises the steps of:
    e1) allowing a first set of said plurality of communication protocols to be updated by a system administrator, said first set applied to all users; and
    e2) allowing a second set of said plurality of communication protocols to be updated by a given user accessing said host computer system with said personal digital assistant, said second set applicable only to said given user.

6. A system for communicating with a peripheral computer system comprising:
    a) a host computer system;
    b) a personal digital assistant;
    c) a two-way communication link between said host computer system and said personal digital assistant, said communication link being established on one transport mechanism of a plurality of transport mechanisms;
    d) adaptation software for execution on said host computer system, said adaptation software for recognizing which of said plurality of transport mechanisms is said one transport mechanism;
    e) said host computer system also operable to determine a communication protocol from a plurality of communication protocols based on which of said plurality of transport mechanisms is used, wherein said host computer system uses a table defining a communication protocol having a plurality of parameters for each of the transport mechanisms, wherein like parameters for different communication protocols are separately adjustable to adapt each communication protocol to a respective transport mechanism; and
    f) said host computer system also operable to communicate information to said personal digital assistant based on said communication protocol determined in paragraph e);
    wherein said communication protocol selects a particular user authentication protocol performed to establish data communication between said personal digital assistant and said host computer system; and
    wherein said communication protocol selects a particular data encryption protocol to be used for data communication between said personal digital assistant and host computer system.

7. The system of claim 6 wherein:
    g) said personal digital assistant operable to recognize said transport mechanism of said plurality of transport mechanisms;
    h) said personal digital assistant also operable to determine said communication protocol from said plurality of communication protocols based on said transport mechanism used; and
    i) said personal digital assistant also operable to communicate information to said host computer system based on said communication protocol determined in paragraph h).

8. The system of claim 6 wherein said plurality of transport mechanisms comprises: communication via a serial line coupled to said host computer; communication via a networked line coupled to said host computer using a network; communication via a wireless link to said host computer; and communication via the Internet.

9. The system of claim 6 further comprising: a user interface coupled to said personal digital assistant, said user interface operable for allowing a user to update a set of said plurality of communication protocols, said set applicable only to said user.

10. The system of claim 6 further comprising: a system administrator interface coupled to said host system, said system administrator interface operable for allowing a system administrator to update a set of said plurality of communication protocols, said set applicable to all users.

11. The system of claim 6 wherein said communication protocol restricts data volume communicated to said personal digital assistant.

12. The system of claim 6 wherein said communication protocol selects a particular data set that can be accessed by said personal digital assistant.

13. An apparatus for transferring information on a host computer system and a personal digital assistant, said apparatus comprising:

a two-way communication link, said communication link connecting said host computer system to a personal digital assistant, said two-way communication link using one transport mechanism of a plurality of transport mechanisms;

identification software residing on said host computer system, said identification software for determining which of said plurality of transport mechanisms is used on said two-way communication link;

adaptation software residing on said host computer system, said adaptation software operable to determine a communication protocol from a plurality of communication protocols based on which of said plurality of transport mechanisms is used on said two-way communication link, wherein said adaptation software allows communication protocol parameters to be adjusted separately for each of the plurality of transport mechanisms, wherein said plurality of communication protocols include a user authentication protocol and a data encryption protocol; and communication software residing on said host computer system, said communication software operable to transfer data between said host computer system and said personal digital assistant based on said communication protocol determined by said adaptation software.

14. The apparatus of claim 13 further comprising: a user parameter program residing on said personal digital assistant, said user parameter program operable to allow a set of said plurality of communication protocols to be updated by a given user, said set applicable only to said given user.

15. The apparatus of claim 13 further comprising: an administrator parameter program residing on said host computer system, said user administrator parameter program operable to allow a set of said plurality of communication protocols to be updated by a system administrator, said set applicable to all users in a system.

* * * * *